United States Patent [19]
Mori

[11] 3,726,196
[45] Apr. 10, 1973

[54] SHUTTER-CONTROL OF SINGLE-LENS REFLEX CAMERAS

[75] Inventor: Chiharu Mori, Tokyo, Japan

[73] Assignee: Asahi Kogaku Kogyo Kabushiki Kaisha, Tokyo-to, Japan

[22] Filed: June 29, 1971

[21] Appl. No.: 157,962

[30] Foreign Application Priority Data

July 2, 1970 Japan.................45/58022

[52] U.S. Cl.................................95/10 CT
[51] Int. Cl..................................G03b 7/08
[58] Field of Search........................95/10 CT

[56] References Cited

UNITED STATES PATENTS

| | | | |
|---|---|---|---|
| 3,324,779 | 6/1967 | Nobusawa et al. | 95/10 |
| 3,347,141 | 10/1967 | Nobusawa et al. | 95/10 |
| 3,568,582 | 3/1971 | Uchida | 95/10 |

FOREIGN PATENTS OR APPLICATIONS

| | | | |
|---|---|---|---|
| 18,672 | 8/1969 | Japan | 95/10 |

Primary Examiner—Samuel S. Matthews
Assistant Examiner—Michael L. Gellner
Attorney—Harold D. Steinberg et al.

[57] ABSTRACT

An electrical system for automatically determining exposure time in a single-lens reflex camera. An electrical circuit includes a storage capacitor and a logarithmic compression element. Through the latter the storage capacitor is charged sequentially to provide a pair of voltages, and the electrical circuit utilizes the difference between these voltages for controlling the exposure time. One of these voltages is determined at least in accordance with the light intensity coming from the object to be photographed and the other of these voltages is determined at least in accordance with the film speed. Thus, the signals according to light intensity and film speed are logarithmically compressed prior to charging of the storage capacitor by way of the logarithmic compression element. In addition, one of the latter signals is modified in accordance with the selected diaphragm setting, so that the modified signal is logarithmically compressed prior to charging of the capacitor.

10 Claims, 3 Drawing Figures

PATENTED APR 10 1973    3,726,196

INVENTOR
CHIHARU MORI
BY
Steinberg and Blake
ATTORNEYS 3,726,196

SHUTTER-CONTROL OF SINGLE-LENS REFLEX CAMERAS

BACKGROUND OF THE INVENTION

The present invention relates to cameras.

More particularly, the present invention relates to electrical systems for controlling the shutter of a single-lens reflex camera of a type which measures light which has initially passed through the objective of the camera.

There are known electrical systems of the above general type which provide a circuit which comprises a logarithmic compression element and a logarithmic expansion element, with the circuit carrying out all of the photographic operations electrically in a fully automatic manner for determining the exposure time. Such electrical circuits, however, are undesirably complex and have the disadvantage, in particular, of lacking the possibility of achieving a high stability at a relatively low cost.

SUMMARY OF THE INVENTION

It is accordingly a primary object of the present invention to provide an electrical system of the above general type which can be manufactured at relatively low cost without sacrificing any accuracy and while at the same time achieving a high degree of stability.

In particular, it is an object of the present invention to provide a circuit of the above general type which will enable the exposure time to be automatically determined in a highly reliable and highly accurate manner with relatively simple inexpensive structure requiring only, on the part of the operator, normal actuation of a shutter-release button or the like.

A further object of the present invention is to provide a structure of the above general type which is made up of a relatively small number of elements which can be manufactured and assembled at low cost and which will operate with the required precision and stability.

Furthermore, it is an object of the present invention to provide circuitry of the above general type which lends itself to use with different types of single-lens reflex cameras.

According to the invention the electrical system for controlling a shutter of a single-lens reflex camera includes an electrical circuit means which has as a part thereof a logarithmic compression means. A plurality of means are operatively connected with the electrical circuit means for introducing into the latter electrical quantities corresponding to the light received from the object to be photographed, the diaphragm setting and the film speed, these quantities being introduced into the circuit by the above plurality of means in the form of two signals which respectively include the quantities corresponding to the light from the object and the film speed and one of these signals also includes the quantity corresponding to the diaphragm setting. A storage capacitor means is electrically connected to the logarithmic compression means to be charged thereby, and a switch means is operatively connected to the logarithmic compression means for transmitting to the latter first one of the above signals and then the other of the above signals. The electrical circuit means coacts with the storage capacitor means for automatically determining exposure time in accordance with the above signals transmitted to the logarithmic compression means sequentially by the switch means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
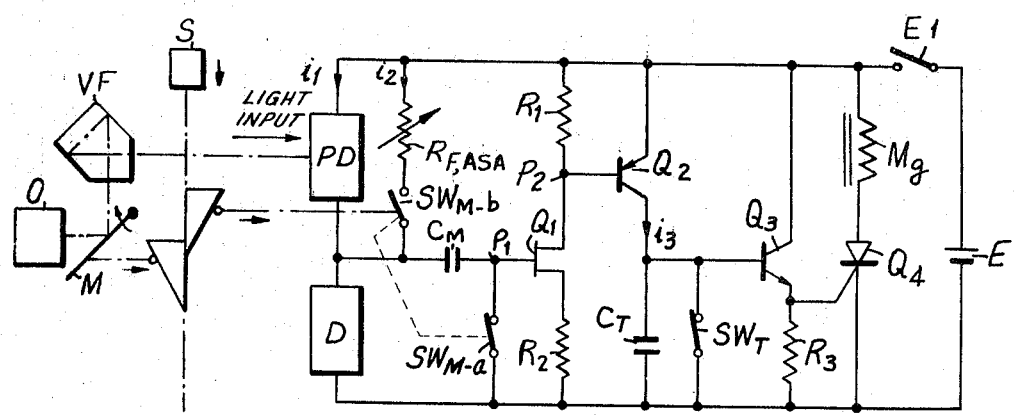
FIG. 1 is a diagrammatic representation of one embodiment of an electrical system according to the invention.

Referring first to FIG. 1, there is illustrated therein an embodiment of the invention which includes a photosensitive means PD in the form of a suitable photodiode or CdS element. Shown to the left of the photosensitive means PD is a schematically represented objective O, a tiltable mirror M, and a viewfinder prism VF for transmitting the light to the photosensitive means when the mirror M is in the position schematically illustrated in FIG. 1. Also FIG. 1 shows schematically a shutter-releasing plunger or button S depressed by the operator for bringing about various operations referred to below. Thus, one of these operations will be the snapping up of the mirror from the position thereof shown in FIG. 1 to an exposure position where the transmission of light to the photosensitive means PD will be interrupted.

The circuitry illustrated in FIG. 1 also includes a variable resistor $R_{F,ASA}$, this variable resistor being set in accordance with the film speed and the preselected diaphragm aperture, as is well known.

The illustrated circuitry also includes a logarithmic compression element D forming for the illustrated electrical circuit means a logarithmic compression means, and this logarithmic compression means D may take the form of a diode, for example. In order to control the transmission of signals to the logarithmic compression means D, the circuitry includes a switch means made up of a switch element $SW_{M-a}$ and a switch element $SW_{M-b}$. These switches are interconnected, as schematically represented in FIG. 1, so that when the switch $SW_{M-a}$ opens the other switch $SW_{M-b}$ closes, and as is schematically shown in FIG. 1, depression of the shutter button S will bring about the opening of the switch $SW_{M-a}$ with the simultaneous closing of the switch $SW_{M-b}$. The operation of these switches as the shutter button is depressed, but before actual release of the shutter for making an exposure, will produce the required processes of storage and photographic calculations by the illustrated circuitry.

The circuitry further includes a buffer circuit of high input resistance type, this latter buffer circuit including the field effect transistor $Q_1$ together with the bias resistance $R_1$ and the load resistance $R_2$. The output of this buffer circuit is transmitted to the base of a logarithmic expansion transistor $Q_2$ of the next-following stage of the illustrated electrical system.

The entire circuit is energized from a voltage source E with a suitable switch $E_1$ being closed at the very start of the operation, as by the very first part of the downward movement of the shutter button S, so as to activate the entire circuit enabling the exposure to be automatically determined. During photometry, or in other words measurement of the light from the object to be photographed, a photoelectric current $i_1$, depending upon light travelling through objective o from the object to be photographed, is obtained from the photosensitive means PD, and this photoelectric current $i_1$ is logarithmically compressed by the logarithmic compression means D, so that the latter means provides a terminal voltage $V_1$ which is in proportion to the logarithmic value of the intensity of the light input, as is well known in the art.

The illustrated circuitry includes a storage capacitor $C_M$ which is charged with this terminal voltage $V_1$ by way of the switch $SW_{M-a}$, so that the storage part of the process is now carried out during the initial part of the operations. Thus, the terminal voltage of capacitor $C_M$ corresponds to the terminal voltage $V_1$ of the logarithmic compression means D.

Just before the mirror M is swung upwardly to the exposure position, interrupting the travel of light to the photosensitive means PD, the switch $SW_{M-a}$ is opened and then the switch $SW_{M-b}$ is closed, resulting in holding the terminal voltage of the capacitor $C_M$ for storage purposes, and now the electrical current $i_2$ passing through the logarithmic compression means D depends only upon the logarithmic compression means D, the source voltage E, and the resistance value determined in accordance with the selected diaphragm setting and film speed, as introduced by the variable resistor $R_{F,ASA}$. Thus, this time there will be a terminal voltage $V_2$ at the logarithmic compression means D, and this latter terminal voltage is in proportion to the logarithmic value of the electrical current $i_2$ since the variable resistor $R_{F,ASA}$ has been provided with the resistance value determined in accordance with the diaphragm setting and film speed and is now connected to the logarithmic compression element D with the photo input from the objective being interrupted by the raised mirror M.

Thus, there will be across the input terminal $P_1$ of the buffer circuit of high input resistance type, a voltage $V_{P1}$ which corresponds to $V_2$ minus $V_1$, or the difference between the terminal voltages sequentially applied to the capacitor $C_M$ by the signal sequentially transmitted to the logarithmic compression means D by way of the switch means formed by the interconnected switch elements $SW_{M-a}$ and $SW_{M-b}$. As a result, the output voltage $V_{P2}$ across the output terminal $P_2$ of the buffer circuit of high input resistance corresponds to G ($V_1 - V_2$), where G designates the voltage gain of the buffer circuit. This output voltage $V_{P2}$ is used as the input to the logarithmic expansion transistor $Q_2$ which is connected into the following stage so that the collector current $i_3$ of the logarithmic expansion transistor $Q_2$ is logarithmically expanded according to the characteristic of the collector current with respect to the base-emitter voltage of the transistor $Q_2$.

Considering the photometry operations in greater detail, the photoelectric conversion characteristic depends upon the photosensitive element PD, for example a photodiode, and the logarithmic compression element D or the logarithmic compression voltage output characteristic of the photoelectric current depending upon the photo-input value. The conversion characteristic into a corresponding electrical signal according to the diaphragm setting and film speed depends upon the resistance of the variable resistor $R_{F,ASA}$ adjusted according to the selected diaphragm aperture and film speed. After the mirror M rises to interrupt the photoinput to the photosensitive element, the operation is determined in accordance with the characteristics of the logarithmic compression element D and the source voltage E, and also at this time the logarithmic expansion characteristic in the logarithmic expansion section will influence the operations, this logarithmic expansion section having the input voltage in accordance with the gate voltage $V_{P1}$ of the field effect transistor $Q_1$ included in the buffer circuit and including the output current in the form of the collector current $i_3$ of the logarithmic expansion transistor $Q_2$, this latter current depending upon the input and output characteristics of the buffer circuit and the collector current characteristic with respect to the base-emitter voltage of the logarithmic expansion transistor $Q_2$. All of the above factors are selected in such a way that their relationship will be indicated by apex or peak indices so that the charging current $i_3$ for timing purposes is obtained as the collector current of the logarithmic expansion transistor $Q_2$.

The section of the electrical circuitry which follows the logarithmic expansion transistor $Q_2$ includes a switching or trigger circuit made up of the timing capacitor $C_T$, the transistor $Q_3$, the SCR $Q_4$, the resistor $R_3$ and the electromagnet $M_g$. All of these components are selected to provide for the switching or trigger circuit a transfer or trigger level selected so that an exposure time is obtained in accordance with the apex or peak indices, and the actual exposure time will be determined from the instance when the switch $SW_T$ opens to start the charging of the timing capacitor $C_T$. As is well known the switch $SW_T$ will be opened after the button S has been depressed to release the leading curtain of the focal plane shutter, so that the timing switch $SW_T$ is opened simultaneously with the running of the leading curtain from its cocked position, while the training curtain remains in its cocked position, so that the shutter opens and the exposure begins. Charging of the timing capacitor $C_T$ continues until the trigger circuit reaches its trigger level, and at this instant the trigger circuit responds in a well known manner to bring about release of the trailing curtain to terminate the exposure by way of the electromagnet $M_g$. Thus, as is well known, the timing capacitor $C_T$ will be charged up to a given level with the charging current $i_3$, and when this level is reached the trailing curtain will be automatically released to terminate the exposure, and in this way the exposure time is automatically determined in accordance with the magnitude of the current $i_3$.

Figure 2:
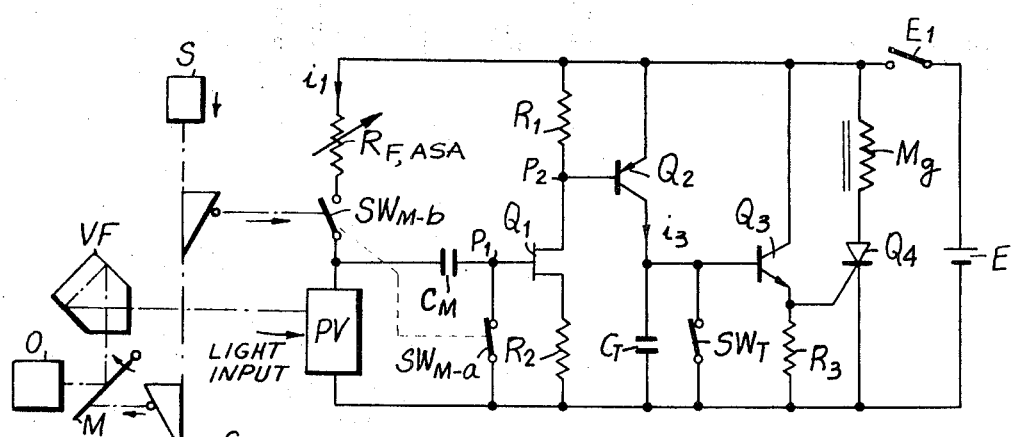
FIG. 2 is a diagrammatic representation of another embodiment of an electrical system according to the invention.

Referring now to the embodiment of FIG. 2, the unit PV is a photosensitive element of PN junction type such as a silicon photocell having a photoelectromotive force characteristic, and the remaining elements included in the circuit of FIG. 2 have the same arrangement and functions as those described above in connection with FIG. 1. Thus it will be observed that in this case also the light which travels through the objective O is first reflected by the mirror M through the viewfinder prism VF to the photosensitive means PV, and the shutter button S operates the switch means and the mirror as described above for first providing a signal according to the light input and for then providing a signal according to the diaphragm setting and film speed. With this embodiment the output voltage $V_1$ is proportional to the logarithmic value of the intensity of the photo-input coming through the objective from an object to be photographed, and this voltage $V_1$ is developed across the terminals of the photosensitive element PV, in a well known manner. It is also well known that when the storage capacitor $C_M$ is charged through the switch $SW_{M-a}$, for starting the storage operation with the first output voltage $V_1$, the terminal voltage of the capacitor $C_M$ corresponds to this output voltage $V_1$. The opening of the switch $SW_{M-a}$ immediately before raising of the mirror M during depression of the shutter button S and the subsequent closing of the switch $SW_{M-b}$ results in holding at the storage capacitor $C_M$ the terminal voltage $V_1$ and now the photosensitive means PV is connected through the variable resistor $R_{F,ASA}$, set according to the diaphragm setting and film speed, to the source E and, after the mirror has been raised, this photosensitive means PV operates as a PN junction diode without being exposed to any photo-input since the photo-input coming through the objective is interrupted by the raised mirror M. Thus, the terminal voltage $V_2$ at this time is proportional to the logarithmic value of the electrical current $i_1$ determined in accordance with the setting of the variable resistor, the resistance of which is determined by the diaphragm setting and film speed, the photosensitive means PV, which receives no photo-input, and the source voltage E.

Thus, with the embodiment of FIG. 2 also the output voltage $V_{P2}$ across the output terminal $P_2$ of the buffer circuit of high input resistance corresponds to G ($V_1 - V_2$) where G designates the voltage gain of the buffer circuit as in the embodiment of FIG. 1, since the voltage $V_{P1}$ across the input terminal $P_1$ of the buffer circuit of high input resistance type corresponds to $V_2 - V_1$. This output voltage $V_{P2}$ is utilized as the input for the logarithmic expansion transistor $Q_2$ connected in the next stage of the circuit so that the collector current $i_2$ of the logarithmic expansion transistor $Q_2$ is logarithmically expanded according to the collector current characteristic with respect to the base-emitter voltage of the transistor $Q_2$.

Thus, the photoelectromotive force characteristic of the photosensitive means or the logarithmic compression voltage output characteristic of the photo-input intensity, the conversion characteristic into an electrical signal according to diaphragm setting and film speed depending upon the PN junction diode characteristic of the photosensitive means, in view of the fact that the photosensitive means PV operates as a diode of PN junction type when the photoinput to the photosensitive means is interrupted by upward movement of the mirror M, the resistance characteristic of the variable resistor $R_{F,ASA}$, set according to the selected diaphragm and film speed, and the source voltage E, as well as the logarithmic expansion characteristic depending upon the input and output characteristic of the buffer circuit and the collector circuit characteristic relative to the base-emitter voltage of the logarithmic expansion transistor $Q_2$, are all selected to carry out the photometry process in such a manner that the relationship between all of these characteristics are determined according to apex or peak indices, so that the charging current $i_2$ for the timing capacitor is obtained as the collector current of the logarithmic expansion transistor $Q_2$. This charging current $i_2$ is therefore used for timing purposes in the manner described above in connection with FIG. 1 so as to obtain the required exposure time.

Figure 3:
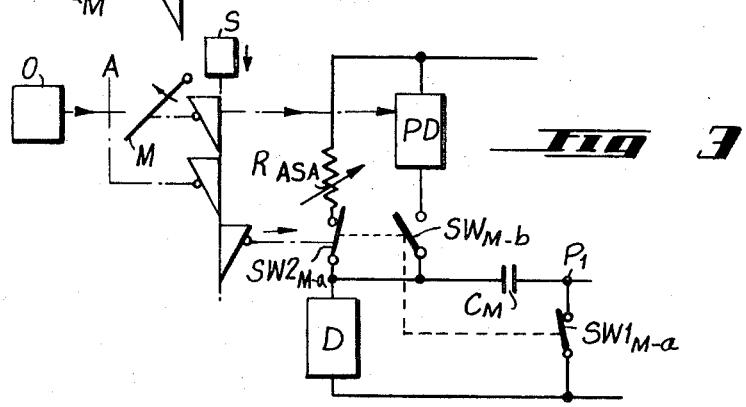
FIG. 3 is a fragmentary diagrammatic illustration of a third embodiment of a system according to the invention.

Although the above embodiments of the invention, as illustrated in FIGS. 1 and 2, respectively, fulfill the photometric requirements peculiar to arrangements as known in the prior art under which the process of photometry occurs with respect to the intensity of the photo input incident upon the surface of the mirror M or just after being reflected thereby, it is to be understood that the present invention is not limited by such a photometric requirement. For example, it is possible after the mirror M rises to determine the intensity of the photo input from the object to be photographed together with the setting of the diaphragm by situating the photosensitive means at a proper position behind the mirror with the diaphragm being automatically stopped down in a well known manner. Thus, as is shown in FIG. 3, the photosensitive means PD corresponding to that of FIG. 1 is connected into the circuit of FIG. 3 in such a way that this photosensitive means PD will be connected to the logarithmic compression means D by the switch means after the signal in accordance with the film speed has been introduced by way of the variable resistor $R_{ASA}$. Thus, in this case the latter variable resistor will be set only in accordance with film speed. FIG. 3 diagrammatically illustrates behind the objective O the adjustable diaphragm A. When the shutter button S of this embodiment is depressed, during the initial part of the movement thereof the mirror M is swung up and the diaphragm A is stopped down to the preselected setting thereof, so that the photosensitive means PD receives light influenced not only by the light coming from the object but also by the setting of the diaphragm, so that in this case the combined quantities of light from the object and the diaphragm setting are introduced through the photosensitive means PD. For this purpose the switch means includes a structure made up of interconnected components $SW1_{M-a}$ and $SW2_{M-a}$, these switch elements being opened just before closing of the switch element $SW_{M-b}$, so that with this embodiment the first signal transmitted to the logarithmic compression means D is in accordance with the film speed and the next signal transmitted to the logarithmic compression means D is in accordance with the combined light from the object and diaphragm setting. Thus, with this embodiment the film speed forms the first input for the logarithmic compression element and then the diaphragm is automatically set to the preselected aperture size through the automatic mechanism diagrammatically shown in FIG. 3 to stop the objective down as the shutter-button is depressed, so that after the mirror rises the information with respect to the intensity of the photo-input from the object to be photographed and the preselected diaphragm setting provides the second input to the logarithmic compression means D. It is therefore possible to bring about with the embodiment of FIG. 3 a photographic operation through the storage capacitor based upon these two inputs in sequence.

In the case of a single lens reflex camera which has a fixed mirror, there will be no interruption in the photo input from an object to be photographed, which would otherwise be caused by upward swinging of the mirror. In this case the photo input signal and the signal with respect to the selected diaphragm setting and film speed are separately obtained, so that the signal with respect to photo input and the signal with respect to diaphragm setting and film speed are successively applied sequentially to a single logarithmic compression means operatively connected with the shutter-release controls in order to bring about proper photographic exposure through the storage capacitor.

As is apparent from the above description, particularly in connection with FIGS. 1 and 2, it is possible in accordance with the invention to bring about all of the required photographic operations through the electric circuitry of the invention with the highest degree of stability in connection with mechanisms in a single-lens reflex camera. Thus, with the invention the signal with respect to the photo input coming from the object to be photographed is utilized as the first input to the logarithmic compression element, in the case of FIGS. 1 and 2, and after the mirror rises in connection with operations to bring about the release of the shutter, so that the photoinput is interrupted, the information or signal with respect to the diaphragm setting and film speed is applied to the logarithmic compression element as the second input, so that the photographic operation in accordance with apex or peak indices is brought about through the storage capacitor on the basis of these two inputs which are transmitted in sequence. Accordingly, the circuit arrangement of the invention for the logarithmic compression and the photographic operations are extremely simple as compared to those previously known. In addition, the photographic operations as referred to above provide results with the highest degree of stability and accuracy, since the extent to which the logarithmic compression element depends upon temperature fluctuations, which is one of the most important factors causing errors in the output with previously known circuitry, is introduced with the circuitry of the invention in such a way that this factor is offset in connection with the two signals. Moreover, in the case where the photosensitive means is in the form of the single unit shown in FIG. 2 having the photoelectromotive force characteristic, achieved as by using a silicon photocell, the circuit arrangement required for the various photometry processes and logarithmic compression are achieved only by way of this single photosensitive unit since the photosensitive unit itself has both the characteristics of photoelectric conversion and logarithmic compression.

What is claimed is:

1. In an electrical system for controlling a shutter of a single-lens reflex camera, electrical circuit means including a logarithmic compression means, a plurality of means operatively connected with said electrical circuit means for introducing into the latter electrical quantities corresponding to the light received from the object to be photographed, the diaphragm setting, and the film speed in the form of two signals which respectively include the quantities corresponding to light from the object and film speed with one of said signals also including the quantity corresponding to the diaphragm setting, storage capacitor means electrically connected to said logarithmic compression means to be charged thereby, and switch means operatively connected to said logarithmic compression means for transmitting to the latter first one of said signals and then the other of said signals, said logarithmic compression means logarithmically compressing first said one signal and then said other signal prior to charging of said storage capacitor means so that the latter is sequentially charged according to both of said signals as logarithmically compressed by said logarithmic compression means, said electrical circuit means coacting with said storage capacitor means for automatically determining exposure time in accordance with said signals transmitted to said logarithmic compression means sequentially by said switch means.

2. The combination of claim 1 and wherein said plurality of means consists of only two means in the form of a photosensitive means and a variable resistor means for respectively introducing into said electrical circuit means at least the quantities corresponding to light received from the object to be photographed and film speed, one of said two means modifying the signal introduced thereby in accordance with the diaphragm setting.

3. The combination of claim 2 and wherein said switch means is operatively connected with said two means and said logarithmic compression means for transmitting to the latter first the signal which includes at least the quantity according to light from the object and then the signal which includes at least the quantity according to film speed.

4. The combination of claim 3 and wherein said variable resistor means introduces the signal which includes the quantities according to both film speed and diaphragm setting.

5. The combination of claim 4 and wherein said photosensitive means and logarithmic compression means form separate units.

6. The combination of claim 2 and wherein said photosensitive means and said logarithmic compression means from a single unit, said photosensitive means and logarithmic compression means including a photocell having an electromotive force characteristic and a logarithmic compression element of PN junction type acting first as a logarithmic compression means for said photocell and then as a logarithmic compression means for said variable resistor means.

7. The combination of claim 2 and wherein said photosensitive means modifies the signal introduced thereby in accordance with the diaphragm setting.

8. The combination of claim 7 and wherein said switch means first introduces the signal according to film speed and then introduces the signal according to light from the object and diaphragm setting.

9. The combination of claim 2 and wherein the circuit means coacts with said storage capacitor means, logarithmic compression means, and said switch means for charging said storage capacitor means according to the difference between the logarithmically compressed signals.

10. The combination of claim 9 and wherein said circuit means includes a buffer circuit portion of high input resistance type operatively connected with said storage capacitor means for receiving therefrom the input according to the difference between the signals sequentially transmitted to said logarithmic compression means by said switch means.

* * * * *